(12) United States Patent
Craciun

(10) Patent No.: US 12,337,420 B2
(45) Date of Patent: Jun. 24, 2025

(54) MULTI-COATED ELECTRODE FOR WELDING STAINLESS STEEL

(71) Applicant: DUCTIL SA, Buzau (RO)

(72) Inventor: Sorin Craciun, Buzau (RO)

(73) Assignee: DUCTIL SA, Buzau (RO)

( * ) Notice: Subject to any disclaimer, the term of this patent is extended or adjusted under 35 U.S.C. 154(b) by 1007 days.

(21) Appl. No.: 16/315,117

(22) PCT Filed: Jul. 4, 2017

(86) PCT No.: PCT/EP2017/066590
§ 371 (c)(1),
(2) Date: Jan. 3, 2019

(87) PCT Pub. No.: WO2018/007364
PCT Pub. Date: Jan. 11, 2018

(65) Prior Publication Data
US 2019/0308281 A1    Oct. 10, 2019

(30) Foreign Application Priority Data
Jul. 5, 2016 (EP) ..................................... 16305846

(51) Int. Cl.
*B23K 35/02* (2006.01)
*B23K 35/36* (2006.01)
*B23K 35/365* (2006.01)
*B23K 35/40* (2006.01)
*B23K 103/04* (2006.01)

(52) U.S. Cl.
CPC ...... *B23K 35/0272* (2013.01); *B23K 35/3607* (2013.01); *B23K 35/3608* (2013.01); *B23K 35/365* (2013.01); *B23K 35/404* (2013.01); *B23K 2103/04* (2018.08)

(58) Field of Classification Search
CPC ............ B23K 35/0272; B23K 35/3607; B23K 35/365; B23K 35/404
See application file for complete search history.

(56) References Cited

U.S. PATENT DOCUMENTS

| | | | |
|---|---|---|---|
| 2,697,159 A | 12/1954 | Donahey | |
| 3,691,340 A * | 9/1972 | Landis | B23K 35/22 219/137 WM |
| 3,783,234 A | 1/1974 | Russell | |
| 3,935,421 A * | 1/1976 | Ballass | B23K 35/0266 219/146.3 |
| 5,124,530 A | 6/1992 | O'Donnell et al. | |
| 5,171,968 A * | 12/1992 | Bates | B23K 35/304 219/146.22 |
| 6,060,195 A * | 5/2000 | Shinyama | H01M 4/52 429/223 |
| 2005/0189337 A1 | 9/2005 | Baune | |
| 2007/0207186 A1* | 9/2007 | Scanlon | A61F 2/91 424/424 |
| 2011/0180523 A1 | 7/2011 | Ikeda et al. | |

FOREIGN PATENT DOCUMENTS

| | | | | |
|---|---|---|---|---|
| CN | 101259574 A | * | 9/2008 | |
| CN | 103223561 A | * | 7/2013 | |
| CN | 103990918 B | * | 6/2016 | ......... B23K 35/0266 |
| EP | 0 342 036 A1 | | 11/1989 | |
| EP | 1 570 944 A1 | | 9/2005 | |
| EP | 2666580 A1 | * | 11/2013 | ......... B23K 35/0266 |
| FR | 2 237 721 A1 | | 2/1975 | |
| GB | 597422 A | * | 1/1948 | |
| GB | 1005467 A | * | 12/1962 | |
| GB | 1 216 344 A | | 12/1970 | |
| JP | 52065144 A | * | 5/1977 | |
| JP | 1-249297 | | 10/1989 | |
| JP | 1-249297 A | | 10/1989 | |
| JP | 10-209800 | | 8/1998 | |
| SU | 404592 A | * | 3/1974 | ............. B23K 35/04 |

OTHER PUBLICATIONS

Carter, "Effects of Basic Electrode Coating Formulation on Fume Emission Rate and Composition in Manual Metal Arc Welding of Steel", Welding Institute Members Report 319, 1986.

Baune et al., "Le soudage des aciers inoxydables a travers des exemples de l'evolution des consommables et des gaz [The welding of stainless steels with examples of developments in consumables and in gases]", Proceedings of the CIMATS Colloque Industriel, Technical University of Belfort Montbeliard, Dec. 13, 2002.

Bonnet et al. "Amelioration de l'environment du soudeur par le biais de la formulation des consommables de soudage [Improvement in the welder's environment by formulation of welding consumables]", Conference Proceedings of the 6th National Welding Workshop "Soudage et Prospective Industrielle [Welding and Industrial Prospectives]", Tours, France, Oct. 21-25, 2002.

Carter, "The effects of electrode formulation on fume emission rate and composition in manual metal arc welding of stainless steel", Welding Institute Technology Report 378, 1988; 30 pages.

Cunat, "Le chrome dans les fumees de soudage des aciers inoxydables [Chromium in stainless steel welding fume]", Materiaux et Techniques, No. 1-2, 2002.

(Continued)

*Primary Examiner* — Geoffrey S Evans
(74) *Attorney, Agent, or Firm* — Knobbe Martens

(57) ABSTRACT

The invention relates to a coated electrode comprising a central metal core being surrounded at least in part by an outer coating containing rutile and at least one lithium-based compound and being free of sodium feldspar and potassium feldspar. According to the invention, the electrode comprises at least one inner coating arranged between the outer coating and the central metal core, said inner coating containing at least one sodium-based compound and/or at least one potassium based compound. Associated process for welding stainless steel.

21 Claims, No Drawings

(56) References Cited

OTHER PUBLICATIONS

Dennis et al., "Control and occupational exposure to hexavalent chromium and ozone in tubular wire arc welding processes by replacement of potassium by lithium or by addition of zinc", Ann. Occup. Hyg., vol. 46, No. 1, pp. 34-42, 2002.
Griffiths, "Development of stainless steel welding electrodes having a low level of toxic chromium in the fume", Strasbourg seminar on welding fume: effects, control and protection, Paper 6, Abingdon, UK, The Welding Institute 1991.
Griffiths et al., "Development of stainless steel welding electrodes having a low level of toxic chromium in the fume", The $5^{th}$ International Symposium of the Japan Welding Society, Advanced Technology in Welding, Materials Processing and Evaluation, 5JWS-IV-3, Tokyo, Apr. 1990.
International Search Report and Written Opinion dated Aug. 17, 2017 in corresponding PCT Application No. PCT/EP2017/066590; 11 pages.
Kimura et al., "Investigations on chromium in stainless steel welding fumes", Welding Journal, pp. 195s-203s, Jul. 1979.
Spiegel-Ciobanu, " Entwicklung schadstoffarmer hoch legierter Cr-Ni-Schweisszusatze-Teil 1: Reduktion des CrVI-Gehalts im Schweissrauch [Development of low-pollutant welding filler wiresfor high Cr-Ni alloys—Part 1: reduction of the CrVI content in welcing fume]", Schweissen und Schneiden , 55(4), pp. 198-200, May 2003 (drawn from the experience of the Boehler Thyssen Welding group).

* cited by examiner

MULTI-COATED ELECTRODE FOR WELDING STAINLESS STEEL

The present invention relates to the field of environmentally friendly coated electrodes of the rutile type, with smooth melting, low fume emission and low emission of hexavalent chromium ($Cr^{VI}$) and having good operative and coating resistance performances, these being intended in particular for the welding of stainless steel.

The fume emitted during welding operations, arising from complex processes, namely vaporization/condensation/oxidation or vaporization/oxidation/condensation, counts among the detractions associated with arc welding. Consequently, the welding fume, the nature and the quantity of which constitute an increasing concern in manufacturing plants, necessitates the use of protection systems, such as fume extractors, so as to preserve the health of operators and members of the personnel working nearby.

From a general standpoint, a stainless steel is defined as an iron alloy whose nominal chromium content is at least 11% by weight. Its use is justified when good oxidation resistance and corrosion resistance are required. Among stainless steels there are several sub-categories of steel, namely:

- austenitic steel, probably most widely used and often mentioned by the name "300 series" owing to its classification according to the United States standardization, the composition of which is based on the iron/chromium/nickel system and the total content of the elements Cr, Ni, Mn and Si in the alloy exceeds 16% by weight;
- martensitic steel;
- ferritic steel;
- duplex steel;
- precipitation-hardening steel alloys; and
- steel superalloys.

Consequently, the high content of the element chromium in stainless steels means that, when they are being welded, the constituent particles of the welding fume contain a high content of compounds containing the element chromium, namely trivalent chromium ($Cr^{III}$), namely the least toxic form of the element chromium, and/or hexavalent chromium ($Cr^{VI}$), a form known as being highly toxic for humans since it is considered to be a carcinogen.

In the case of welding stainless steels, the hexavalent chromium element ($Cr^{VI}$), resulting from the welding fume and present in the air breathed, is therefore particularly regulated owing to its potential toxicity.

Thus, knowing that the regulations in force in most countries indicate that the tolerated average exposure value (AEV) is 5 mg/m3 of air for "harmless" fume particles and that that of the element $Cr^{VI}$ contained in the fume is equal to 0.05 mg/m3, as reported by P. J. Cunat in "Le chrome dans les fumees de soudage des aciers inoxydables", [Chromium in stainless steel welding fume], Matériaux et Techniques, No. 1-2 2002, the maximum tolerated concentration of $Cr^{VI}$, in order for this not to entail the need for reducing the maximum fume content in the air breathed, must be at most 1%, i.e. (0.05/5)×100. Below 1%, $Cr^{VI}$ is therefore not a factor limiting the amount of permissible fume in the air breathed.

In comparison, since the AEV of trivalent chromium ($Cr^{III}$) is 0.5 mg/m³, its maximum permissible concentration in fume, in order not to entail the need for reducing permissible fume in the air breathed, is 10%.

Beyond this figure, in welding shops, in order to limit the amount of fume and the proportion of $Cr^{VI}$ in the air breathed by operators below the maximum permissible values, using conventional welding products for stainless steels the ventilation of the welding shop must be very much better than that needed when using products for conventional steels.

By adjusting the formulation of a conventional coated electrode, it is possible to reduce the welding fume at source. These formulation modifications thus constitute the most effective way of limiting the harmful effects caused in the welder's environment, even before installing often expensive equipment, such as fume extractors.

This is all the more so as the method of welding with a coated electrode, owing to its ease of implementation, is widely used for welds in confined spaces in certain welding shops or worksites where it is sometimes difficult to install really effective fume extraction.

The principle of $Cr^{VI}$ generation in fume is illustrated by equations [1] and [2] below and lies in the formation, during welding, of certain noxious compounds containing the element $Cr^{VI}$, such as for example $Na_2Cr^{VI}O_4$, $K_2Cr^{VI}O_4$, $NaK_3(Cr^{VI}O_4)^2$ or $K_2NaCr^{VI}F_6$ resulting from the reaction of the elements sodium (Na) and potassium (K) present in the electrode composition with chromium (Cr):

$$2Na+Cr+2O_2 \rightarrow Na_2Cr^{VI}O_4 \quad [1]$$

$$2K+Cr+2O_2 \rightarrow K_2Cr^{VI}O_4 \quad [2]$$

To reduce the contents of these compounds containing the element CrVI in the fume, the document by S. Kimura, M. Kobayashi, T. Godai and S. Mimato, "Investigations on chromium in stainless steel welding fumes", Welding Journal, pages 195s-203s, July 1979, proposed the elimination, in electrode coating formulations, of all ingredients containing the elements Na and K and substitution with "equivalent" ingredients based on lithium (Li).

Thus, it is known either to substitute Na or K feldspars, such as $KAlSi_3O_8$ or $NaAlSi_3O_8$, present in conventional non-environmentally friendly formulations for electrode coatings with Li-based aluminosilicate compounds having very similar properties, such as petalite $LiAlSi_4O_{10}$, spodumene $LiAl(SiO3)2$ or eucryptite $LiAlSiO_4$, or to replace the standard Na and K silicates with Li silicate.

However, this solution has always been difficult to implement and has never been really able to be established as an industrial practice since the use of a lithium-based binder as replacement for sodium- and/or potassium-based binders results in electrodes having a fragile, or even highly friable, coating, making the electrodes thus formulated unusable in an industrial environment where the electrodes are often accidentally knocked or roughly handled, leading to their rapid deterioration when they are not mechanically robust enough.

Moreover, compounds based on Na and K, whether in the form of powders and/or liquid silicates, are conventionally used almost automatically in the coatings of coated electrodes in order to give the products their good arc characteristics, especially arc stability and dynamics. This is the reason why electrodes formulated on the basis of lithium silicate alone, and therefore containing no Na and K, exhibit operating weldability that is very inferior to that of standard electrodes.

The document drawn from the experience of the Boehler Thyssen Welding group and published by V. E. Spiegel-Ciobanu "Entwicklung schadstoffarmer hoch legierter Cr—Ni-Schweisszusatze—Teil 1: Reduktion des CrVI-Gehalts im Schweissrauch [Development of low-pollutant welding filler wires for high Cr—Ni alloys—Part 1: reduction of the CrVI content in welding fume]", Schweissen and Schneiden, 55(4), pages 198-200, May 2003 describes the difficulty of producing such environmentally friendly stainless steel electrodes containing no Na and K, in particular because of the low strength of their coating, and confirms their significantly inferior operating weldability compared with that of standard stainless steel products.

Finally, although the principle of substituting ingredients containing the elements Na and K with "equivalent" ingredients based on Li has been known for a long time for lowering the fume emission content and the amount of $Cr^{VI}$ in the fume, only the document by T. Griffiths and A. C. Stevenson "Development of stainless steel welding electrodes having a low level of toxic chromium in the fume", The 5th International Symposium of the Japan Welding Society, Advanced Technology in Welding, Materials Processing and Evaluation, 5JWS-IV-3, Tokyo, April 1990 describes the manufacture of stainless steel electrodes formulated from exclusively Li silicate and compounds and having a robust coating, with low fume and $Cr^{VI}$ emissions, and having operating properties that are said to be "satisfactory".

However, it turns out in practice that the operating properties of these electrodes have proved to be very inferior to those rutile-type electrodes said to be "smooth fusion" electrodes so that, since the publication of that document, no electrode of this type has appeared on the stainless steel electrode market.

Moreover, the documents by D. O'Donnell and R. Bishel, "Stable low fume stainless steel welding electrode", Inco Alloys International Inc., 1991 and U.S. Pat. No. 5,124,530 and the document by Koike Hiroyuki, "Cr-contained coated electrode", Nippon Steel Corp., 1989 and JP-A-1249297 themselves propose stainless steel electrodes with fume emission reduced simply by the use of mixed silicates based on Na, K and Li.

However, the use of mixed silicates based on Na, K and Li does not lower the $Cr^{VI}$ content in the fume sufficiently, owing to the presence of Na and K elements resulting in the inevitable formation of hexavalent chromium according to the mechanisms of formulae [1] and [2] mentioned above.

Moreover, several other publications have dealt with fume emissions during welding, and mention may be made, by way of indication, of the following documents:

G. Carter, "The effects of basic electrode coating formulation on fume emission rate and in manual metal arc welding of steel", Welding Institute Members Report 319, 1986;

J. Dennis, M. French, P. Hewitt, S. Mortazavi and A. Redding, "Control and occupational exposure to hexavalent chromium and ozone in tubular wire arc welding processes by replacement of potassium by lithium or by addition of zinc", Ann. Occup. Hyg., Vol. 46, No. 1, pp. 33-42, 2002;

T. Griffiths, "Development of stainless steel welding electrodes having a low level of toxic chromium in the fume", Strasbourg seminar on welding fume: effects, control and protection, Paper 6, Abingdon, UK, The Welding Institute, 1991;

C. Bonnet, P. Rouault, B. Leduey, F. Richard and E. Bauné, "Amélioration de l'environment du soudeur par le biais de la formulation des consommables de soudage [Improvement in the welder's environment by formulation of welding consumables]", Conference Proceedings of the 6th National Welding Workshop "Soudage et Prospective Industrielle [Welding and Industrial Prospectives]", Tours, France, 21-25 October, 2002; and E. Bauné, B. Leduey, F. Richard and P. Rouault, "Le soudage des aciers inoxydables à travers des l'éxemples de revolution des consommables et des gaz [The welding of stainless steels with examples of developments in consumables and in gases]", Proceedings of the CIMATS Colloque Industriel, Technical University of Belfort Montbéliard, 13 Dec. 2002.

The European patent application No. EP 1 570 944 A1 also discloses formulation means that are based on the conventional solution of eliminating in the formulations all ingredients containing the alkaline metal elements Na and K and in substituting them with "equivalent" ingredients based on lithium (Li).

In particular, the Na-based and K-based compounds ($KAlSi_3O_8$ and $NaAlSi_3O_8$) normally present are replaced with equivalent or similar Li-based compounds, such as spodumene ($LiAl(Si_2O_6)$), petalite ($LiAlSi_4O_{10}$) or eucryptite ($LiAlSiO_4$) for example.

These electrodes give excellent performances in low fume and CrVI emissions but, however, still need to be improved since they remain less satisfying, in terms of operating weldability and coating strength, than standard "rutile smooth fusion" electrodes, that is to say electrodes having a single coating which traditionally contain the elements Na or K.

Given the state of the art, the problem that arises is how to improve coated electrodes intended for welding stainless steels so as to be able to reduce the fume emission content and the $Cr^{VI}$ content in fume in relation to standard conventional stainless steel electrodes, while having obtaining a coating robustness and a level of operating weldability in accordance with the requirements for electrodes of this type, especially as regards their arc, in particular arc initiation and stabilization, bead appearance and slag detachment characteristics.

In other words, the problem that arises is to provide a range of environmentally friendly coated electrode formulations, with a robust coating, of the smooth-fusion rutile type, intended for welding stainless steels, which result in a deposited metal (after fusion) whose chemical composition is in accordance with the standards relating to the various grades of stainless steel, in particular to the standards EN 1600 and AWS A5.4.

The solution of the invention is a coated electrode according to claim 1.

Within the context of the invention, the term "free of" a given compound is understood to mean that the said compound has not been intentionally included in the considered coating and, ideally, that the said coating does not contain any of it at all. However, the possible presence of this compound in trace form as unavoidable impurities is not excluded, although not desirable. Electrodes whose coating therefore contains such compound traces would be considered as being included within the field of protection provided by the present invention.

Depending on the case, the electrode of the invention may include one or more of the following technical features:
- the outer coating fully covers the inner coating.
- at least one aluminosilicate, especially at least one lithium feldspar, is chosen from spodumene, petalite and eucryptite.
- the central metal core is made of stainless steel or of mild steel.
- the diameter of the core is between 1.6 and 6 mm, preferably between 2.5 and 5 mm.
- at least one extrusion agent is chosen from the group formed by carboxymethylcellulose (CMC), hydroxyethylcellulose, water-soluble organic substances or resins, calcium alginate, plant-based polymers, such as guar gum, or else clay (with a typical formula of $Al_2O_3 \cdot 2SiO_2 \cdot 2H_2O$).

the outer coating represents at least 60%, preferably about 67%, of the overall coating, hence the inner coating represents preferably 33% of the overall coating.

the outer coating comprises at least about 20% by weight of the coating of one or more metallic elements in the form of ferro-alloys or of individual elements chosen from manganese, nickel, chromium, molybdenum, iron, silicon, aluminium, niobium, tantalum and copper, and their blends. the outer and the inner coating represent between 35% and 42% of the total weight of the electrode.

the outer coating represents between 24 and 28% of the total weight of the electrode.

the inner coating represents between 11 and 14% of the total weight of the electrode.

the outer coating and/or the inner coating are obtained from a dry blend of coating powders, formed from at least 40% by weight in the dry formulation of particles with a particle size greater than or equal to 100 μm and of at least 10% of fine particles with a particle size of less than or equal to 40 μm.

the outer coating and/or the inner coating contain, expressed in % by weight in the coating, from 4 to 18% carbonates in powder form, preferably from 8 to 13% carbonates.

said carbonates are chosen from $CaCO_3$ and $MgCO_3$ and may be present in similar proportions.

The invention further relates to a process for manufacturing an electrode, comprising the following steps:

providing a metal core, carrying out a concentric extrusion of an inner coating around at least a part of said metal core, said inner coating containing at least one sodium-based compound and/or at least one potassium-based compound, carrying out a concentric extrusion of an outer coating around at least a part of the inner coating, said outer coating containing rutile and at least one lithium-based compound and being free of sodium feldspar and potassium feldspar, and baking the coated metal core in a furnace.

Preferably, the concentric extrusion of the outer coating is carried out so that said outer coating fully covers the inner coating.

Furthermore, the invention relaters to an assembly of an inner coating and an outer coating for covering an electrode, the outer coating covering at least a part of the inner coating, said outer coating containing rutile and at least one lithium-based compound and being free of sodium feldspar and potassium feldspar and said inner coating containing at least one sodium-based compound and/or at least one potassium-based compound.

Depending on the case, the process and/or the assembly according to the invention may involve an inner coating and/or an outer coating having one or more of the technical features mentioned in the present description.

The invention also relates to a stainless steel arc welding process in which an electrode according to the invention is used to produce at least one welded joint on one or more workpieces to be welded, and to the coating of such an electrode. The operation of coated-electrode arc welding starts when the operator initiates the welding arc by touching/rubbing the tip of his electrode on the workpiece, the said electrode and the said workpiece forming an integral part of the electrical installation, in the same way as the welding generator, these being connected to one another via the combination of cables of the installation and the earth connection. The intense heat thus produced causes the tip of the electrode and the base metal to melt at the point of impact of the arc. Metal is then transferred through the arc to the workpiece. The metal is thus deposited on the workpiece progressively as the electrode is consumed by being melted. The operator must then ensure that the arc is maintained by keeping the tip of the electrode at a certain height above the workpiece and by moving it at a uniform speed along the workpiece. While the weld is being deposited, a sufficient quantity of heat is maintained in order to melt the tip of the electrode and the zone subjacent to the arc on the workpiece to be welded.

In general, a coated electrode for arc welding is an electrically conducting rod, called a core, surrounded by an adherent covering, usually called a coating, from the tip of which the welding arc emanates. The energy of the arc is thus used as a means of heating the workpieces to be joined together.

During development of the coated electrode, the metal core is generally chosen, as far as possible, in such a way that its chemical composition corresponds to the grade of the base metal to be welded. However, it may also be made of mild steel, that is to say containing practically no alloying element with the exception of a small amount of manganese, the alloying elements essential for depositing the desired grade then being provided by the coating this then being called a "synthetic" electrode. Whatever the case may be, the content of alloying elements of the coating is never zero, as this non-zero content makes it possible to improve the mechanical properties of the weld and to compensate for the losses due to volatilization of the metal elements during melting of the electrode when an alloyed core, whose composition is close to that of the metal to be deposited, is used, or to provide the alloying elements necessary for synthesizing the composition of the metal to be deposited when a mild steel core is used.

The coating has paramount influence on the welding characteristics and the resulting properties of the deposited metal. Its major roles are not only electrical and mechanical, but also metallurgical.

The main functions that the ingredients in the coating composition must provide are numerous. Most of the constituents may have more than one function and the combination of several constituents depending on the precise contents may allow a particular function to be achieved.

The various coating constituents may thus be classified in various families, namely the constituents in powder form and the constituents in liquid form.

The constituents in powder form are in particular:

agents for shielding the deposited metal, i.e. the shielding gas formers and the slag constituents. The shielding gas formers are mineral powders whose decomposition generates gas ($CO_2$, CO, HF, H2, $H_2O$ in vapour form, etc.) and shields the metal in transit in the welding arc from the ambient air. The slag constituents are mineral powders which are transformed to form the slag that envelops the metal drops in transit in the arc and that, on solidifying on the weld bead, shields it from the external atmosphere;

deoxidizing agents, which are mineral powders allowing purification of the weld by the formation and then settling of the oxides and sulphides formed;

arc initiators and stabilizers, which are mineral and metal materials that help in the initiation of the welding arc between the tip of the electrode and the workpiece to be welded and keep it stable;

alloying elements (also deoxidizing agents or reducing agents), which are metallic materials that help to alleviate the losses by volatilization in the arc of the constituent elements of the metal core and to enrich the weld bead with metal elements, or to synthesize the composition of the metal to be deposited when the electrode is formulated from a mild steel core;

agents for regulating the viscosity of the slag, which are metallic and mineral materials making it possible to control the melting range and the time that the slag takes to solidify on cooling. In particular, elements recognized as being powerful surfactants prove to be very effective;

agents for regulating the efficiency of the electrode, i.e. the ratio of the mass of deposited metal to the mass of molten core, these being metallic materials for adjusting the rate of deposition of the electrode; and extrusion agents, which are organic materials making it possible, in combination with the binders and the powders used, to obtain good consistency of the paste and acquisition by the latter of its rheological properties for the purpose of extruding it. A good consistency of the paste often makes it possible to achieve good coating strength after baking.

Moreover, the constituents in liquid form are especially the binders, which most often are liquid silicates used for agglomerating the dry powders making up the coating before paste that allows extrusion to take place is formed.

The blend making up the coating composition for manufacture of a coated electrode is prepared in an operating method comprising the following steps.

The ingredients in dry form that have to make up the coating composition are firstly weighed and blended so as to obtain a uniform blend. A binder (or several binders) is (are) then added in order to wet the dry blend within a mixer.

After the rheological properties of the coating paste have been assessed, the latter is formed and then a concentric extrusion of the coating around the metal cores, precut to the required length, is carried out by means of an electrode press.

This therefore results in electrode concentricity or centering of the coating extruded around the cores. Good centering is necessary for the quality of the final product. The tips of the electrodes must then be prepared by brushing the coating. The initiating tip of the electrodes is usually prepared by graphitizing or aluminizing, depending on the nature of the product.

Finally, after the electrodes have been predried in the ambient atmosphere, they are baked in a furnace. This baking operation may be carried out, optionally in steps, up to a temperature of around 350-500° C.

The present invention will now be better understood thanks to the following detailed explanations.

Low Fume Emission and Low $Cr^{VI}$ Content

In order to considerably reduce the contents of compounds containing the element $Cr^{VI}$ in the fume, the formulation means employed consist in providing a coated electrode having an inner coating and an outer coating, and adopting the solution of eliminating in the formulations of the outer coating all ingredients containing the alkaline metal elements Na and K and in substituting them with "equivalent" ingredients based on lithium (Li).

Thus, the Na-based and K-based compounds ($KAlSi_3O_8$ and $NaAlSi3O8$) normally present are replaced in the outer coating with equivalent or similar Li-based compounds, such as spodumene ($LiAl(Si2O_6)$), petalite ($LiAlSi_4O_{10}$) or eucryptite ($LiAlSiO_4$) for example.

The main function of these compounds used as coating constituents is to control the viscosity of the liquid slag, help to form the slag and therefore to shield the deposited metal, and to help to stabilize the arc during welding.

But the viscosity of the lithium silicates used within the context of the invention is generally very low, i.e. typically from 15 to 50 centipoise (cp) at room temperature (20° C.), and therefore much less than those of the conventional Na and/or K silicates, the viscosity range of which is typically from 150 to 600 cp. The density of the lithium silicate used within the context of the invention is around 1.2.

Consequently, owing to the high fluidity and the very specific rheological properties of the lithium silicate recommended within the context of the conventional solution of eliminating in the formulations all ingredients containing the alkaline metal elements Na and K and in substituting them with "equivalent" ingredients based on lithium (Li), substantial difficulties do arise at various stages in the process for manufacturing the environmentally friendly stainless steel electrodes, in particular:

the low viscosity of the Li silicate results in a lack of tack of the latter and, consequently, results in difficulties, on the one hand, in obtaining good plasticity of the paste used for its preparation during the mixing/wetting steps and, on the other hand, in compacting and extruding the paste and in forming it around the metallic core of the electrode;

the nature of the Li silicate causes an embrittlement effect in the coating, which occurs during the final electrode baking cycle.

Thus, the electrodes thus obtained have coatings that are less strong from the mechanical standpoint (resistance to impact, dropping, rubbing, bending, etc.) while they are being packaged, transported and subsequently used in an industrial environment, than standard rutile smooth-fusion electrodes. These electrodes also exhibit lower operating weldability than smooth-fusion type electrodes.

To alleviate the abovementioned difficulties, it is proposed a multi-coated electrode comprising at least one outer coating and one inner coating arranged between the metal core and the outer coating, wherein the outer coating is free of Na and K compounds and the inner coating contains Na and/or K compounds.

In an unexpected way, Na and K compounds, even contained in small amounts in the overall coating material of the electrode, that is to say when considering the inner and the outer coatings globally, are still able to provide good welding operative performance and robustness when said compounds are not uniformly dispersed in the overall coating but rather located in major proportion, even exclusively, near the central metal core of the electrode. In this way, the Na and K compounds are placed as close as possible to the area of the welding arc and are able to ensure good operative performances.

Thanks to the invention, it is thus possible to formulate an electrode having, in its overall coating, a spatial distribution of Na and K compounds that is controlled so as to reduce fume and $Cr^{VI}$ emissions with respect to standard rutile smooth fusion electrodes, while having welding and strength performances similar to that obtained with those standard rutile smooth fusion electrodes.

Table 1 below illustrates, for an electrode of 308L grade with a central core made of stainless steel of the 308L type and having a diameter of 3.2 mm, the formulation basis of an outer coating and an inner coating according to the invention (ranges of % values).

The electrode of Formula A was formulated from a blend of dry powders according to the prior art, whereas the electrode of Formula B consisted of dry powders according to the invention, both formulations being manufactured by means of a lithium silicate according to the invention.

The percentages (%) are expressed as % by weight in the constituent in question.

TABLE 2

| Electrode type | | A (Prior art) | B (Invention) | |
|---|---|---|---|---|
| | | | Inner coating | Outer coating |
| Raw materials (powder + binder) of the coating composition (% by weight in the coating | Various metal elements | 22.5% | 21% | 21% |
| | Oxides, carbonates, fluorides and other extrusion agents | 48.9% | 55% | 49% |
| | Type of aluminosilicate | Na and K feldspar: 22% | Specific low K alumino-silicate (preferably slate powder) = 9% and Spodumene = 11% | Spodumene = (Li compound): 25% |
| | | Composed K + Na silicate | Li silicate | Li silicate |
| Silicate (dry part) | SiO$_2$ | 4.6% | 3.46% | 4.32% |
| | Li$_2$O | 0.06% | 0.48% | 0.6% |
| | K$_2$O | 1.8 | 0 | 0 |
| | Na$_2$O | 0.2% | 0.06% | 0.08% |
| Total | | | 100% | |
| Rate of Cr$^{VI}$ emission | | 9.9 mg/min | 2.35 mg/min | |
| Rate of fume emission | | 0.30 g/min | 0.21 g/min | |
| Resultant Cr$^{VI}$ in the fume | | 3.24% | 1.08% | |

According to the invention, the electrode may also have a diameter of 2.5 mm, 3.2 mm, 4.0 mm or 5.0 mm.

The presence of the Na-based and K-based compounds in the outer coating comes from residual traces of these elements. Despite the precautions taken, the formulation of the outer coating may therefore not be completely free of the elements Na and K, which are in the form of impurities that are unavoidable but not intentionally added.

TABLE 1

| Composition (% by weight in the considered coating) | Inner coating | Outer coating |
|---|---|---|
| Li$_2$O | 1-2 | 2-3 |
| K$_2$O + Na$_2$O | 0.6-0.8 | 0-0.2 |
| TiO$_2$ | 15-40 | 15-40 |
| SiO$_2$ | 10-30 | 10-30 |
| Al$_2$O$_3$ | 3-10 | 3-10 |
| Carbonates | 5-15 | 5-15 |
| CaF$_2$ | 1-8 | 1-8 |
| Metallic materials (Cr, Ni, Mn, Fe) | balance | Balance |

Table 2 below illustrates, for two electrodes (A and B) of the 308L type, with a 3.2 mm diameter central core made of stainless steel of the 308L type, these being formulated on the same formulation basis and from the same lithium silicate introduced in liquid form in a fixed amount for wetting, the influence of the choice of feldspar type on the amount of hexavalent chromium in the welding fume generated by these electrodes.

It may be noted that, in Table 2, the Li$_2$O content of 0.48% is the Li$_2$O which is sourced exclusively by the silicate (dry part), whereas in Table 1, the Li$_2$O content of between 1 and 2% represents the total Li$_2$O (sourced by the silicate plus the spodumene.

As Table 2 shows, Electrode B according to the invention results in fume containing 3 times less Cr$^{VI}$ than with Electrode A. When considering the rate of fume emission expressed in mg/min, the electrode B according to the invention releases 4 times less Cr$^{VI}$.

Likewise, the rate of fume emission from Electrode B according to the invention is greatly reduced compared to that from Electrode A.

Indeed, Electrode B has an outer coating formulated from spodumene as substitute for the Na and K feldspars used in Electrode A, while the inner coating is formulated from spodumene and slate powder as a specific silico-aluminate having a low K content.

Slate powder, also called sericite, is a multi-mineral, metamorphic argilaceous rock made of an aggregate of minerals and colloidal substances. Its essentially mineral composition includes quartz, mica, chlorite, sericite & oxides of iron with occasional spots/knots of minerals like garnet, pyrite, and ulasite.

The use of slate powder as a silico-aluminate material according to the invention has the particular advantage of ensuring simultaneously good extrusion behavior and good weldability, while containing a low K content.

Moreover, within the context of the present invention, it is also advantageous to consider extrusion agents for formulating the coated electrodes.

In general, these are organic materials which, in combination with the binders and powders used, make it possible to obtain good consistency of the paste and acquisition by the latter of its rheological properties so that it can be extruded around the metal core of the electrode.

In addition, good paste consistency makes it possible to achieve good coating strength after baking. Moreover, the extrusion agents have to be chosen judiciously, since drying the electrodes results, within the coating, in them decomposing into ash, the hydroscopic nature of which is deleterious to the electrodes.

While taking all this into account, within the context of the present invention, certain constituent extrusion agents of conventional electrode coatings, which traditionally contain the elements Na or K, were replaced in the outer coating with other compounds containing neither of these elements.

Thus, it is recommended within the context of the present invention to proscribe the extrusion agents frequently employed, such as Na or K alginates, from the inner and outer coating and to replace them with suitable extrusion agents according to the invention, such as carboxymethylcellulose (CMC), hydroxyethylcellulose or any other water-soluble organic substance or resin, calcium alginate, plant-based polymers, such as guar gum, talc (with a typical formula of $3MgO \cdot 4SiO_2 \cdot H_2O$) or else clay (with a typical formula of $Al_2O_3 \cdot 2SiO_2 \cdot 2H_2O$).

Advantageously, the inner coating may contain at least one extrusion agent containing Na and/or K, so as to maintain operative welding performance and resistance performance similar to that of smooth-fusion type electrode.

This is illustrated in Table 3, by the difference between the smooth-fusion type electrode C having a single coating wherein extrusion agents contain Na and K according to the prior art, and electrode D, which is in accordance with the invention and where the Na-based and K-based extrusion agents were replaced with extrusion agents free of Na and K in the outer coating. The electrodes are of the same diameter of 3.2 mm and manufactured from Li silicate.

Furthermore, to produce environmentally friendly stainless steel electrode formulations according to the invention, it is advantageous to replace, in the outer coating, the Na-based and/or K-based binders normally used with purely Li-based binders.

The binders are generally aqueous silicates used in liquid form for agglomerating the dry powders making up the coating before the paste used for the extrusion is formed. The amount of silicate used must be such that a thin film is created between the powder particles, the silicate or silicates acting as a bridging agent between the powder particles.

Coating Robustness of the Coated Electrodes

By complying with the formulation rules according to the invention, it is possible for environmentally friendly stainless steel electrodes to have a robust coating after they have been baked, and to be manufactured on an industrial scale under satisfactory conditions.

In order to quantitatively assess the coating robustness of the electrodes manufactured in the course of the development, several types of tests were carried out:

bending test: the electrodes are bent on a cylinder having a diameter which depends on the electrode diameter. For a 2.5-mm diameter electrode, the bending diameter is 230 mm. For a 3.2-mm diameter electrode, the bending diameter is 300 mm. For a 4.0-mm or 5.0-mm diameter electrode, the bending diameter is 540 mm. The evaluated features are coating adherence to the central core and coating cohesion;

falling test: this test consists in successively dropping ten electrodes, obtained from the same manufacturing run, from a height of 75 cm onto a metallic surface, and in expressing the robustness of their coatings with a fraction by weight of the coating lost after one fall. The evaluated features are coating adherence to the central core and shock resistance;

vibration test: a plastic box is partly filled with electrodes (40% of the internal volume of the box remains free) and is subjected to vibration conditions during 2 minutes on a mechanized industrial sieve equipment. The evaluated feature is the resistance to abrasion.

For each electrode, the results are expressed in terms of weight loss, following the relation:

Weight loss (%)=100×(Initial electrode weight Final electrode weight)/Initial electrode weight.

For the falling and bending tests, the result expressed for each type of electrodes corresponds to the mean calculated for the ten electrodes of the type in question.

For the vibration tests, whatever the electrode diameter, 40% of the plastic box remains empty.

The results given in Table 3 show that the simultaneous/combined use of the "environmentally friendly" ingredients, namely Li silicate, spodumene and Na/K-free compound in the outer coating and Li silicate, spodumene and a low K-content alumino-silicate in the inner coating, lead to stainless steel electrodes according to the invention (B) having a coating whose mechanical resistance is similar to that of standard electrodes.

These results show that, by properly controlling the lithium silicate used, and also the formulation/manufacturing parameters, it is possible to achieve levels of coating robustness that are equivalent to those of standard, non-environmentally friendly, stainless steel electrodes, that is to say less than about 2%, even less than about 1.5% of the coating being lost after one drop in respect of electrodes having a core diameter of 3.2 mm or less. It is also important to note that, during welding, no sign of embrittlement of the coating is observed when exposed to the heat of the arc that propagates along the electrode. Thus, the melting of the coating during welding meets the requirements for such smooth-fusion electrodes.

The bending tests also confirmed the good robustness of the coating on the environmentally friendly electrodes formulated from lithium silicate according to the present invention.

Crossed tests were carried out with conventional stainless steel electrodes (type A) manufactured from feldspars and Na/K-based silicates, and electrode of type B, whose outer coating is manufactured from spodumene and Li silicate free of Na/K and whose inner coating is manufactured from spodumene and low K silico-aluminate, in particular slate powder and Li silicate according to the invention. The results given in Table 4 demonstrate a similar resistance for types A and B.

Table 3 show results obtained with electrodes of types A and B, of the grade 308L and having a diameter of 3.2 mm.

Table 4 show results of similar comparative tests carried out for other grades and diameters of electrodes having coating compositions according to prior art or to the invention.

The results demonstrate that the negative effect on coating resistance given by the various Li compounds (mainly the binder) can be compensated through the particular coating formulation according to the invention, which is robust, practically insensitive when abrasion or bending stresses are applied. Coating adherence on the rod wire is also good;

even slightly inferior with respect to prior art electrode. The coating according the invention is robust enough when subjected to shock (falling).

in this case by a regular noise, of low sound intensity, on which a slight crackling is superposed, and is a sign of obvious operating comfort for the welder.

TABLE 3

| | | A | B (Invention) | |
|---|---|---|---|---|
| Electrode type | | (Prior art) | Inner coating | Outer coating |
| Raw materials (powder + binder) of the coating composition (% by weight in the coating) | Various metal elements | 22.5% | 21% | 21% |
| | Oxides, carbonates, fluorides and other extrusion agents | 48.9% | 55% | 49% |
| | Type of aluminosilicate | Na and K feldspar: 22% | Na and K feldspar =: 0% Spodumene (Li compound) = 11% Specific low K alumino-silicate (slate powder) = 9% | Spodumene (Li compound) = 25% |
| | | Composed K + Na silicate | Li silicate | Li silicate |
| Silicate (dry part) | SiO$_2$ | 4.6% | 3.46% | 4.32% |
| | Li$_2$O | 0.06% | 0.48% | 0.6% |
| | K$_2$O | 1.8 | 0 | 0 |
| | Na$_2$O | 0.2% | 0.06% | 0.08% |
| Total | | | 100% | |
| Results (loss by weight as a %) | | | | |
| Bending | | 0 | 0 | |
| Falling | | 0.7 | 0.8 | |
| Vibration | | 0 | 0.1 | |

TABLE 4

| Type | | Mass loss (%) | | |
|---|---|---|---|---|
| Grade-Diameter | Type | Bending | Falling | Vibration |
| 308L-2.5 mm | A | 0 | 0.4 | 0 |
| | B | 0 | 0.7 | 0 |
| 308L-3.2 mm | A | 0 | 0.6 | 0 |
| | B | 0 | 0.6 | 0.1 |
| 308L-4.0 mm | A | 0 | 0.5 | 0.1 |
| | B | 0 | 0.8 | 0.1 |
| 308L-5.0 mm | A | 0 | 0.4 | 0.5 |
| | B | 0 | 0.6 | 0.5 |
| 309L-2.5 mm | A | 0 | 0.8 | 0.2 |
| | B | 0 | 1.6 | 0.3 |
| 309L-3.2 mm | A | 0 | 0.6 | 0.1 |
| | B | 0 | 1.1 | 0.1 |
| 309L-4.0 mm | A | 0 | 1.4 | 0.4 |
| | B | 0 | 2.0 | 0.4 |
| 316L-2.5 mm | A | 0 | 0 | 0.2 |
| | B | 0 | 1.1 | 0.3 |
| 316L-3.2 mm | A | 0 | 1.1 | 0.4 |
| | B | 0 | 1.1 | 0.6 |
| 309L-4.0 mm | A | 0 | 0.7 | 0.1 |
| | B | 0 | 1.5 | 0 |

Operating Performance of Coated Electrodes, in Particular Smooth Fusion and Slag Detachment Fusion reflects the manner in which the electrode melts during welding. It characterizes the transfer of molten coating and metal droplets that takes place between the electrode, which is consumed, and the weld pool on the workpiece to be welded.

Fusion that takes place with the transfer of predominantly fine droplets is termed "smooth fusion". It is characterized Smooth fusion is accompanied by a very low amount of spatter during welding. These spatter particles, when they exist, are very fine and represent the amounts of metal that are ejected from the arc during welding or that result from the splashing of the liquid metal droplets in the weld pool.

In flat welding, the slag line is the line that defines the boundary between the weld pool, that is to say the liquid metal, at the tip of the electrode and the liquid slag floating on the surface.

Since it defines the size of the weld pool, the shape and the stability of the slag line determines the shape and the regularity of the subjacent weld bead and, in particular, the fineness and the regularity of the striations on the surface of the weld bead after solidification.

For a "smooth fusion" electrode, the slag line is generally very close to the tip of the electrode behind the base of the arc.

The formulation of a smooth-fusion electrode must therefore be such that the slag line appears calm and stable, as otherwise it may constitute an impediment for the welder and generate surface defects in the bead (relatively pronounced and irregularly spaced striations, etc.) or even inclusions of slag in the deposit.

In general, the formulation of a smooth-fusion electrode must allow stable fusion and a stable slag line to be obtained.

Apart from the operating aspect during welding, a smooth-fusion stainless steel electrode is characterized by:
 in horizontal fillet welding, a generally flat, or even concave, bead appearance;
 fine striations regularly spaced apart;
 a stable and regular weld bead;

of course, a bead free of defects, such as channels, slag adhesion, cracks or pitting; and easy slag detachment, or even self-detachable slag, over its entire length or over certain parts.

In the smooth-fusion rutile formulations, surfactant elements, such as Sb, Bi, Se, Te and S, must be judiciously controlled in the coatings in order to obtain good slag detachment without affecting the operating performance and/or the strength of the product's coating.

The weld pool visibility is also used to qualify the operative conditions. Indeed, if the weld pool can be easily seen, this means that it does not interfere with the slag, which makes the electrode easy controllable by the welder.

Advantageously, a good bead aspect means a bead that is concave, regular in shape, having fine and regular ripples, and silver-coloured.

Good arc striking means that, when the electrode is touched by the workpiece, the arc ignition instantly occurs. Tests of arc re-striking (also called cold re-striking) were also carried out. After starting the welding process, the arc is stopped a few seconds, typically between 7 and 10 seconds, so that the electrode becomes colder. Then the electrode is touched by the workpiece. Good arc re-striking means that the arc ignition occurs instantly, by hitting the electrode on the workpiece only once. This is an advantageous feature since hitting the electrode on the workpiece several times can destroy locally the coating.

Comparative tests were carried out with electrodes of the 308L grades formulated on a 3.2-mm diameter core made of 308L grade, in flat and horizontal fillet welding positions. Using a 110 A current intensity. The evaluation was done by ranging the results on a scale spanned between 1 to 10, the number 10 corresponding to the highest achievable performance, namely smooth fusion, stable arc, little or no spatter and a weld bead that is attractive, sound, clean, uniform, shiny and finely striated, with good wetting. It can be seen on Table 4 that electrodes of type B exhibit superior operative welding performances than electrodes of type A. Testing conditions are indicated below:

Welding source: FLEX 4000CEL, OCV=80V
Base material of the workpiece to be welded: 304L
Welding positions: flat (PA) and horizontal fillet (PB)
Polarity: DC+

TABLE 5

| | | | B (Invention) | |
|---|---|---|---|---|
| Electrode type | | A (Prior art) | Inner coating | Outer coating |
| Raw materials (powder + binder) of the coating composition (% by weight in the coating | Various metal elements | 22.5% | 21% | 21% |
| | Oxides, carbonates, fluorides and other extrusion agents | 48.9% | 55% | 49% |
| | Type of aluminosilicate | Na and K feldspar: 22% | Na and K feldspar = 0% Spodumene (Li compound) = 11% Specific low K-based alumino-silicate (slate powder) = 9% | Spodumen (Li compound) = 25% |
| | | Composed K + Na silicate | Li silicate | Li silicate |
| Silicate (dry part) | SiO$_2$ | 4.6% | 3.52% | 4.4% |
| | Li$_2$O | 0.06% | 0.48% | 0.6% |
| | K$_2$O | 1.8 | 0 | 0 |
| | Na$_2$O | 0.2% | 0% | 0% |
| Total | | | 100% | |
| Operative performances | | | | |
| Strike | | 10 | 10 | |
| Cold re-strike | | 10 | 10 | |
| Arc stability | | 9 | 10 | |
| Weld pool visibility | | 10 | 10 | |
| Spatters | | 10 | 10 | |
| Weld bead aspect | | 9 | 10 | |
| Slag detachability | | 10 | 10 | |
| Wettability | | 10 | 10 | |
| Operative performances | | 9 | 10 | |
| Visible fume | | 8 | 10 | |
| TOTAL | | 45 | 50 | |

The results of these tests can be extended to current intensity values of 80 A, 115 A, 150 A, and 200 A, used for welding with electrodes having diameters of 2.5, 3.2, 4.0, and 5.0 mm, respectively. Other tests with electrodes of the 309L or 316L grade gave similar results. The operating conditions for each electrode diameter are given in Table 6.

TABLE 6

| Electrode diameter (mm) | Plate thickness (mm) | Current intensity (A) |
|---|---|---|
| 2.5 | 3 | 75-80 |
| 3.2 | 5 | 110-115 |
| 4.0 | 10 | 150 |
| 5.0 | 10 | 200 |

During the tests, the electrodes according to the invention (type B) exhibited a very stable and smooth, spatter-free, arc metal transfer. The strike and cold re-strike were good. The weld bead is almost flat, having a nice silver color aspect, with fine and regular ripples. The weld pool is very clear and visible during welding. The slag removal is good, sometimes even self releasing. In addition, a lower quantity of fumes was noticed. The result of the welding behavior evaluation is summarized in table 5.

Sensitivity to Cracking Phenomena

The cracking phenomena were investigated by addressing the potentially most sensitive diameter value, that is to say 5.0 mm. The tests were focused on cracks occurring after the baking cycle, as well on the drying conditions, especially on the water loss dynamic.

Previous investigations demonstrated that the cracking sensitivity is strongly linked by the moisture amount existing in the coating at the moment of baking. The higher the moisture level, the higher the probability of cracks occurrence. Hence, the bigger the amount of moisture released by the coating during the period of air drying (time between the extrusion and baking phases), the easier the elimination of cracks.

Since the environmental conditions play also a crucial role on dehydration rate, therefore on the cracks appearance, electrodes according to prior art (type A) and according to the invention (type B) were exposed in different locations, characterized by different temperature and relative humidity, as shown in Table 8.

The results given in Table 7 show that type B according to the invention allows practically a rate of water releasing during air drying phase that is twice faster than the type A according to prior art. In addition, the type A series need a significantly longer air drying period (24 hours vs. 8 hours for type B) and/or more favorable exposure conditions, that is to say dry spaces. Even in these conditions, the risk of cracking remains high.

For type B, in normal conditions of 48 hours air drying time, a very low cracking risk is anticipated. Moreover, the achievable shorter air drying time lead to a Work In Progress (WIP) reduction. Indeed, the electrodes are extruded but they still wait to be baked in ovens; the shorter the time period between the extrusion and baking phases, the higher the efficiency, with a relevant positive effect on production efficiency.

TABLE 7

| Type | Drying place | Drying time (hours) | Weight after extrusion (g/piece) | Weight before baking (g/piece) | Weight after baking (g/piece) | Air drying loss (%) | Baking loss (%) | Total loss (%) | Cracks (%) |
|---|---|---|---|---|---|---|---|---|---|
| A | Laboratory | 8 | 86.70 | 85.15 | 82.05 | 1.72 | 3.64 | 5.36 | 80 |
| A | Production | 8 | 86.85 | 84.55 | 82.20 | 2.57 | 2.78 | 5.35 | 70 |
| A | Conservation chamber | 8 | 86.75 | 84.70 | 82.15 | 2.29 | 3.01 | 5.30 | 80 |
| A | Laboratory | 24 | 86.60 | 83.37 | 82.00 | 3.67 | 1.64 | 5.31 | 0 |
| A | Production | 24 | 86.60 | 83.25 | 81.95 | 3.81 | 1.56 | 5.37 | 0 |
| A | Conservation chamber | 24 | 86.60 | 83.25 | 81.95 | 3.81 | 1.56 | 5.37 | 0 |
| B | Laboratory | 8 | 87.00 | 84.20 | 82.00 | 3.13 | 2.61 | 5.75 | 0 |
| B | Production | 8 | 87.10 | 83.65 | 82.15 | 3.89 | 1.79 | 5.68 | 0 |
| B | Conservation chamber | 8 | 86.90 | 83.85 | 82.00 | 3.43 | 2.21 | 5.64 | 0 |

TABLE 8

|  | Conservation chamber* | Production environnement | Laboratory |
|---|---|---|---|
| T (° C.) | 30 | 30 | 25 |
| RH (%) | 17 | 17 | 20 |

*The differences in environmental conditions between conservation chamber and production environment are the following: no air currents, stable conditions and no risk of humidity pick-up in the conservation chamber.

The invention claimed is:

1. A coated electrode comprising:
   a central metal core comprising a stainless steel having chromium alloyed with iron;
   an outer coating at least partly surrounding the central metal core, the outer coating comprising rutile and at least one lithium-based compound, wherein the outer coating is essentially free of sodium (Na) feldspar and potassium (K) feldspar; and
   at least one inner coating arranged between the outer coating and the central metal core, the inner coating comprising:
   rutile,
   at least one lithium-based aluminosilicate having lithium (Li) in an amount of 0.1 to 1% by weight on the basis of a total weight of the inner coating,
   a lithium silicate, and
   one or both of a sodium-based aluminosilicate and a potassium-based aluminosilicate, wherein about 10 to 55% by weight of the total weight of the inner coating is in the form of ferroalloys or of individual elements,
wherein the outer coating and the inner coating represent between 35% and 42% of the total weight of the electrode.

2. The electrode according to claim 1, wherein the at least one inner coating is a single inner coating, wherein the inner coating covers at least a part of the central metal core, and wherein the outer coating covers at least a part of the single inner coating.

3. The electrode according to claim 1, wherein the outer coating comprises:
at least one lithium-based aluminosilicate, wherein the at least one lithium-based aluminosilicate is present in an amount of 5 to 45% by weight on the basis of a total weight of the outer coating or in an amount such that Li from the at least one lithium-based aluminosilicate is present in an amount of 0.2 to 3% by weight on the basis of the total weight of the outer coating;
at least one extrusion agent essentially free of one or both of Na and K;
lithium silicate as binder; and
one or more metal elements in the form of ferroalloys or of individual elements in an amount of 10 to 55% by weight on the basis of the total weight of the outer coating.

4. The electrode according to claim 1, wherein the outer coating is free of sodium-based and potassium-based compounds.

5. The electrode according to claim 1, wherein a total proportion of Na and K in the outer coating is less than or equal to 0.14% by weight on the basis of a total weight of the outer coating.

6. The electrode according to claim 1, wherein $Na_2O$ and $K_2O$ is present in the outer coating at an amount less than or equal to 0.35% by weight on the basis of a total weight of the outer coating.

7. The electrode according to claim 1, wherein the outer coating comprises 1 to 4% by weight of $Li_2O$ on the basis of a total weight of the outer coating.

8. The electrode according to claim 1, wherein the one or both of the sodium-based aluminosilicate and the potassium-based aluminosilicate comprises a slate powder.

9. The electrode according to claim 1, wherein the inner coating comprises one or both of at least one extrusion agent and/or at least one arc initiating and stabilizing agent comprising Na and/or K.

10. The electrode according to claim 1, wherein one or both of $Na_2O$ and $K_2O$ are present in the inner coating at an amount greater than or equal to 0.4% by weight on the basis of a total weight of the inner coating.

11. The electrode according to claim 1, wherein when present, one of both of $Na_2O$ and $K_2O$ are present in the inner coating at an amount less than or equal to 1% by weight on the basis of a total weight of the inner coating.

12. The electrode according to claim 1, wherein a total proportion of Na and K in the inner coating is greater than or equal to 0.15% by weight on the basis of a total weight of the inner coating.

13. The electrode according to claim 1, wherein a total proportion of Na and K in the inner coating is less than or equal to 0.36% by weight on the basis of a total weight of the inner coating.

14. The electrode according to claim 1, wherein the inner coating comprises up to 2.5% of $Li_2O$ on the basis of a total weight of the inner coating.

15. The electrode according to claim 1, wherein a weight ratio between the outer and the inner coating ranges from 1.5/1 to 2.5/1.

16. The electrode according to claim 1, wherein one or both of the outer coating and the inner coating comprises, on the basis of a total weight of the one or both of the outer coating and the inner coating, a powder comprising:
0.8 to 18.5% by weight of $Al_2O_3$;
5 to 40% by weight of $SiO_2$;
15 to 45% by weight of $TiO_2$;
1.4 to 4.2% by weight of CaO;
1.4 to 4.2% by weight of MgO; and
0.5 to 10% by weight of $CaF_2$.

17. The electrode according to claim 1, wherein one of both of the outer coating and the inner coating comprises, on the basis of a total weight of the one or both of the outer coating and the inner coating:
0.4 to 10.0% by weight of Al;
2.0 to 19% by weight of Si;
9.0 to 27% by weight of Ti;
1.0 to 3.0% by weight of Ca; and
0.8 to 2.5% by weight of Mg.

18. A process for arc welding one or more stainless steel workpieces, in which an electrode according to claim 1 is used to produce at least one welded joint on the one or more workpieces.

19. The electrode according to claim 1, wherein the outer coating represents about 67% of the total weight of the inner coating and the outer coating.

20. A method of manufacturing an electrode, the method comprising:
providing a central metal core comprising a stainless steel having chromium alloyed with iron;
carrying out a concentric extrusion of an inner coating around at least a part of the central metal core, the inner coating comprising rutile, at least one lithium-based aluminosilicate, a lithium silicate, and one or both of a sodium-based aluminosilicate and a potassium-based aluminosilicate;
carrying out a concentric extrusion of an outer coating around at least a part of the at least one inner coating, the outer coating comprising rutile and at least one lithium-based compound and being free of sodium feldspar and potassium feldspar; and
baking the central metal core coated with the inner coating and the outer coating in a furnace,
wherein the outer coating and the inner coating represent between 35% and 42% of the total weight of the electrode, and
wherein the inner coating comprises:
lithium (Li) in the at least one lithium-based aluminosilicate present in an amount of 0.1 to 1% by weight on the basis of a total weight of the inner coating, and about 10 to 55% by weight of the inner coating is in the form of ferroalloys or of individual elements.

21. An assembly of a central metal core, an inner coating and an outer coating for an electrode, the central metal core comprising a stainless steel having chromium alloyed with iron, the outer coating covering at least a part of the inner coating, the outer coating comprising rutile and at least one lithium-based compound and being free of sodium feldspar and potassium feldspar, wherein the inner coating comprises rutile, at least one lithium-based aluminosilicate, a lithium silicate, and one or both of a sodium-based aluminosilicate and a potassium-based aluminosilicate, wherein the outer coating and the inner coating represent between 35% and 42% of the total weight of the electrode, and wherein the inner coating comprises:
  lithium (Li) in the at least one lithium-based aluminosilicate present in an amount of 0.1 to 1% by weight on the basis of a total weight of the inner coating; and
  about 10 to 55% by weight of the total weight of the inner coating is in the form of ferroalloys or of individual elements.

* * * * *